United States Patent [19]

Ahmed et al.

[11] 4,341,580
[45] Jul. 27, 1982

[54] METHOD OF FORMING AN ELONGATED COMPOSITE LAMINATE TUBE

[76] Inventors: Nazeer Ahmed; Myrna M. Ahmed, both of 17 Wedgewood Dr., Danbury, Conn. 06810

[21] Appl. No.: 228,997

[22] Filed: Jan. 27, 1981

[51] Int. Cl.³ .............................................. B61H 81/00
[52] U.S. Cl. .................................... 156/190; 156/195; 156/381; 156/582
[58] Field of Search ................................ 156/200-202, 156/184, 190-192, 194, 195, 169, 171-175, 425, 428-432, 180, 581, 582, 583.1, 583.3

[56] References Cited

U.S. PATENT DOCUMENTS

| | | | |
|---|---|---|---|
| 2,977,630 | 4/1961 | Bayler | 156/180 |
| 3,034,566 | 5/1962 | McKay | 156/180 X |
| 3,328,224 | 6/1967 | Kennedy et al. | 156/432 X |
| 3,394,245 | 7/1968 | Waldrop | 156/582 X |
| 3,560,298 | 2/1971 | McArthur et al. | 156/188 X |

Primary Examiner—David A. Simmons

[57] ABSTRACT

Two cooperatively rotating annular wheels are temporarily deformed against each other radially to form a contact length and are partially located in a heated chamber. Each annular wheel is connected to a rotating shaft by means of flexible means. A positive pressure is maintained in the heated chamber. A circumferential groove is provided on the rim of each annular wheel so that when the two annular wheels rotate cooperatively, the grooves cooperate to form a closed orifice along the contact length of the annular wheels. A mandrel, rotating about its axis, protrudes into this orifice. A plurality of elongated composite plies are wound around the mandrel and are clamped and carried forward by the annular wheels. In the heated chamber, the elongated plies are subjected to a sustained pressure and temperature. They are cured under this pressure and temperature after which they are cooled under pressure and exit from between the annular wheels as an elongated cured composite tube.

2 Claims, 2 Drawing Figures

FIG·1

METHOD OF FORMING AN ELONGATED COMPOSITE LAMINATE TUBE

BACKGROUND

This invention describes a method of forming an elongated tubular product. Specifically, it describes a continuous method of forming a composite laminate tube.

Tubular products are in widespread use in everyday life. Hoses are used to carry water and other fluids. Cans, which are tubular with closed ends, are used in packaging and as containers. In particular, tubular products made of composite laminates are used in aerospace applications. Composite construction offers the advantages of lightweight, high strength and high stiffness.

Most composite tube construction is done manually and intermittently. Tyically, a tube is made by manually winding elongated composite plies in a prescribed order around a stationary mandrel and curing the wound tube in an oven at elevated temperature and pressure. The intermittent methods are labor intensive and expensive. Furthermore, if there is a loss of pressure in the even during the curing process, voids may be formed in the composite tube which may entail rejecting the cured composite product.

It is therefore advantageous to provide a continuous method of forming a composite laminate tube, which overcomes the aforesaid disadvantages.

PRIOR ART

Methods of fabricating composite tubes are known. In U.S. Pat. No. 4,106,968 granted to Kutnyak et al., a method of making a composite hose is described. In this method an uncured hose is first formed by wrapping layers of composite plies around a mandrel. The uncured hose is removed from the mandrel, cut into shorter pieces, placed over a contoured mandrel and cured. This method is thus an intermittent method. It is advantageous to provide a method of forming a composite tube wherein the layup and cure is done continuously. Such a method would enable the forming of an extended length of tube, reduce manual handling and provide improved process control.

OBJECTIVES OF THIS INVENTION

The objectives of this invention are (1) to provide a method of forming an elongated composite tube in which layup and cure is carried on continuously;

(2) to provide a method of forming an elongated composite tube in which the tube is mechanically supported around a mandrel during cure and in which the pressure necessary during cure is applied by mechanical means.

DRAWINGS

FIG. 1 shows a preferred embodiment of the instant invention in which an elongated composite tube is continuously formed.

FIG. 2 shows a section through the mandrel and the rims of the annular wheels illustrated in FIG. 1.

DESCRIPTION OF DRAWINGS

In order to keep the instant invention in perspective, we refer to two of our previous inventions. In U.S. Pat. No. 4,220,029 we presented a method of continuously forming an elongated rod by extruding it through a stationary die. The pressure necessary for extrusion as well as the means for pushing the elongated rod through the die were supplied by a pair of cooperatively rotating radially compliant toruses. In U.S. Pat. No. 4,242,897 we presented a method of continuously forming a tube by feeding an elongated rod into a stationary bridge die. The extrusion pressure as well as the means for pushing the elongated rod into the split die were supplied by a pair of cooperatively rotating annular wheels connected to rotating shafts by springs.

Figure 1:
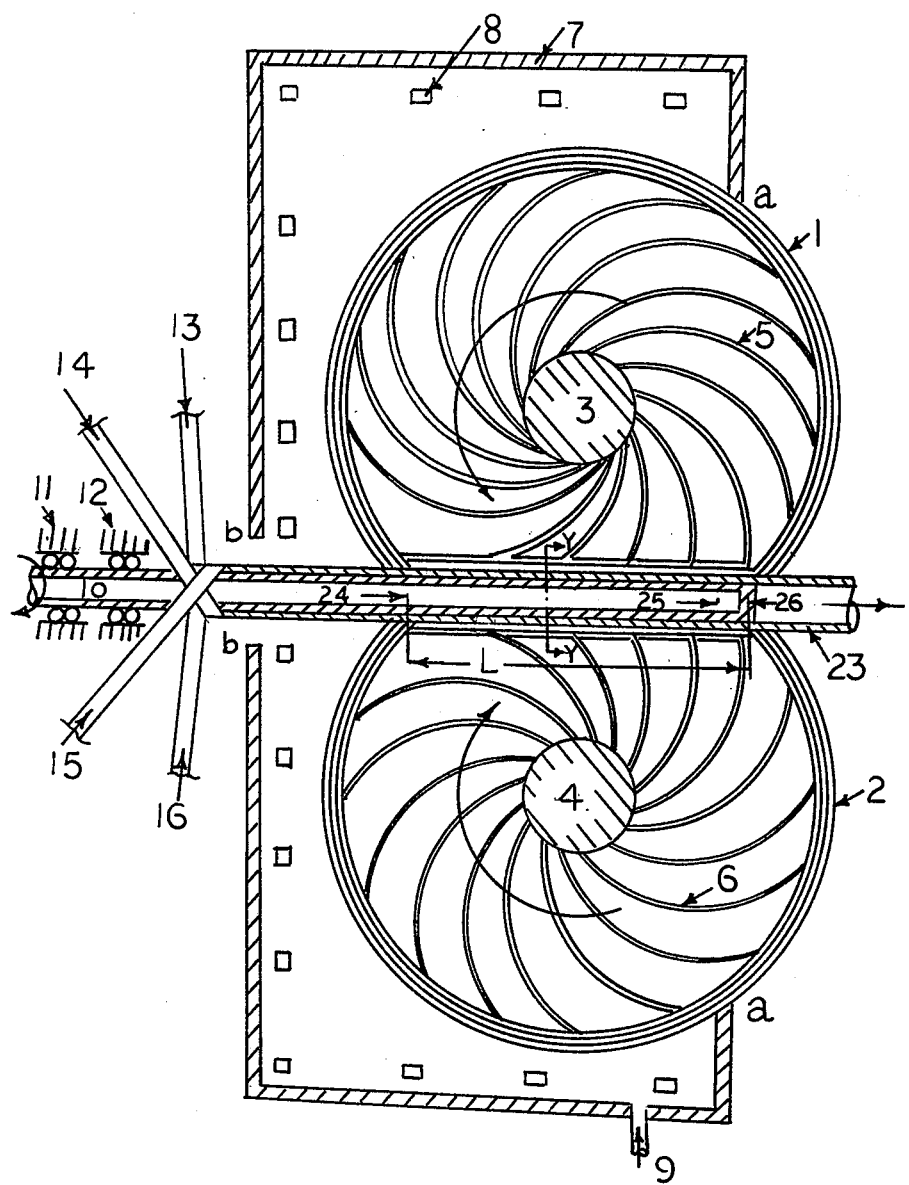
In FIG. 1 is shown a preferred embodiment of the instant invention. Annular wheels 1 and 2 rotate on shafts 3 and 4 respectively. Annular wheel 1 is attached to shaft 3 by means of flexible means 5. Annular wheel 2 is attached to shaft 4 by means of flexible means 6. The rims of both annular wheels are built up of a plurality of thin sheets. A circumferential groove is provided on the rim of each annular wheel so that when annular wheels 1 and 2 rotate cooperatively, the circumferential grooves cooperate to form a closed orifice. The annular wheels are radially squeezed against each other to form a contact length L and located in a chamber 7 such that a major portion of the contact length L is enclosed by the chamber. Heaters 8 provide means for heating chamber 7. An opening 9 enables heated air to be admitted into the chamber so that a positive pressure is maintained in the chamber and its temperature is held at temperature T. At one end of the chamber is an opening aa to allow the annular wheels 1 and 2 to rotate freely. At the other end of the chamber is an opening bb through which is inserted a hollow rotating mandrel 10. The mandrel extends into the orifice formed by the cooperatively rotating annular wheels 1 and 2 substantially through the contact length L. The dimensions of the orifice and of the mandrel are such that the radial clearance between the two is substantially equal to the thickness of the tube to be formed. Hot air is circulated in the hollow mandrel 10 which is supported in bearings 11 and 12.
Figure 2:
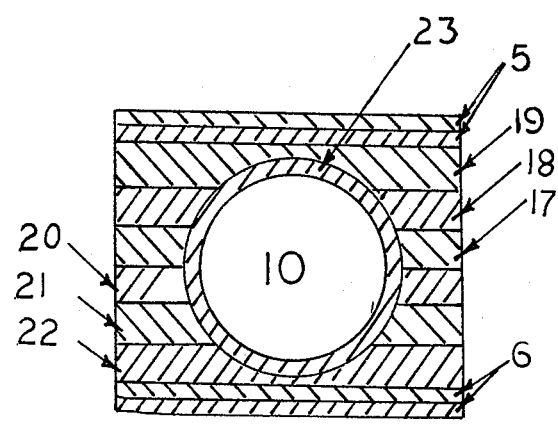
FIG. 2 shows a cross section YY through the mandrel along the contact length L. The laminate tube 23 surrounds the mandrel 10. The rim of annular wheel 1 is shown built up of three layers 17, 18 and 19. The rim of annular wheel 2 is also shown built up of three layers 20, 21 and 22. The rim of annular wheel 1 is backed up by flexures 5. Two such flexible means are shown in this cross section. The rim of annular wheel 2 is backed up by flexible means 6. Two such flexible means are also shown in this cross section.

As the mandrel 10 rotates, sheets of composite materials 13, 14, 15 and 16 are wrapped around it. The first sheet or first ply 13 is wrapped substantially inclined 85 degrees to the mandrel axis. The second ply 14 is wrapped inclined 45 degrees to the mandrel axis. The third ply 15 is wrapped at minus 45 degrees to the mandrel axis. The fourth ply 16 is wrapped at an angle of minus 85 degrees to the mandrel axis. Thus the illustrated sequence in FIG. 1 is 85, +45, −45, −85. For the sake of clarity only four plies are shown in FIG. 1. More plies may be added and/or the layup sequence changed to obtain desired directional properties in the tube.

To start tube fabrication, the plies are wrapped around mandrel 10. The mandrel is inserted into the heated chamber 7 and the annular wheels 1 and 2 are clamped around it. The rims of wheels 1 and 2 and the flexures are so designed that the laminate tube is subjected to a clamping pressure p between the annular wheels and the mandrel. The initial layup is cured at an elevated temperature T for a desired period t. When the initial cure is complete, the annular wheels 1 and 2 are cooperatively rotated. As the annular wheels rotate they carry forward the formed tube. Thereafter, the layup, cure and cooling operations are continuous. The uncured tubular laminate is continuously pulled over the rotating mandrel 10 into the heated chamber 7 and clamped between the rotating annular wheels and the mandrel. Clamping begins at point 24 along the contact length L. Point 25 along the contact length L marks the end of the heated chamber 7. Between points 24 and 25 the laminate cures under pressure p and temperature T. Between points 25 and 26 the cured laminate is cooled under pressure p. Point 26 also marks the end of the mandrel. Beyond point 26 the tube 23 exits continuously as a cured and cooled composite tube.

EXAMPLE 1

It is desired to form a GY70/934 composite tube. The GY70/934 graphite epoxy composite is widely used commercially. For this composite, the temperature T in the chamber is held between 275 degrees F. and 350 degrees F. Heated air is admitted into the chamber 7 to keep a positive air pressure of ¼ psig to ½ psig. The rims of annular wheels 1 and 2 and the flexible means 5 and 6 are designed so that the contact pressure p between the annular wheels and the mandrel is between 80 psi and 100 psi. Annular wheels 1 and 2 each have a diameter of 8 feet and are radially squeezed against each ether to form a contact length L of 2 feet. The wheels are located in chamber 7 so that the distance between points 24 and 25 is 1.5 feet. Four plies, each 0.005 inches thick, are wrapped around the rotating mandrel in the sequence 85°, +45°, −45°, −85°. The annular wheels 1 and 2 are cooperatively rotated so that it takes the tube nine hours to traverse the distance from point 24 to point 25 and a further three hours to traverse the distance from point 25 to point 26. The GY70/934 graphite epoxy composite laminate tube is cured at a temperature T of 275° F. to 350° F. and a pressure p of 80 psi to 100 psi between points 24 and 25 for a period t of nine hours. Between points 25 and 26 it is cooled under pressure. Beyond point 26 the tube exits as an elongated, cured composite tube.

We claim:

1. A method of forming an elongated composite laminate tube, the method consisting of
   providing a pair of cooperatively rotating annular wheels each of which has a rim built up of a plurality of sheets and connected to a rotating shaft by means of flexible means,
   providing a circumferential groove on the rim of each of the said annular wheels,
   temporarily deforming said wheels radially against each other so as to cause a contact length L and pressure p between them and so that the said grooves cooperate to form a closed orifice,
   providing a rotating mandrel and inserting said mandrel into the orifice formed between the annular wheels along their contact length so that the radial clearance between the mandrel and said orifice is substantially equal to the thickness of the composite tube to be formed,
   locating said annular wheels in a heated chamber whose temperature is held at an elevated temperature T so that between fifty and eighty percent of contact length L is enclosed by the heated chamber,
   wrapping a plurality of elongated composite plies around said rotating mandrel, so that
   said plies form a tube around the mandrel and the tube is clamped and carried by the annular wheels and cured in the said chamber at an elevated temperature T and pressure p and is subsequently cooled under pressure and thereafter exits from between the annular wheels as an elongated cured composite laminate tube.

2. A method as in claim 1 wherein
   said elongated plies are graphite epoxy composite plies,
   said temperature T in the heated chamber is held between 275° F. and 350° F.,
   said pressure p along the contact length L is held between 80 psi and 100 psi,
   said annular wheels are rotated such that the tube formed around the rotating mandrel is subjected to a pressure of 80 psi to 100 psi and a temperature of 275° F. to 350° F. for a period of nine hours and is subsequently cooled at a pressure of 80 psi to 100 psi for three hours and exits from the annular wheels as an elongated cured graphite epoxy composite laminate tube.

* * * * *